UNITED STATES PATENT OFFICE.

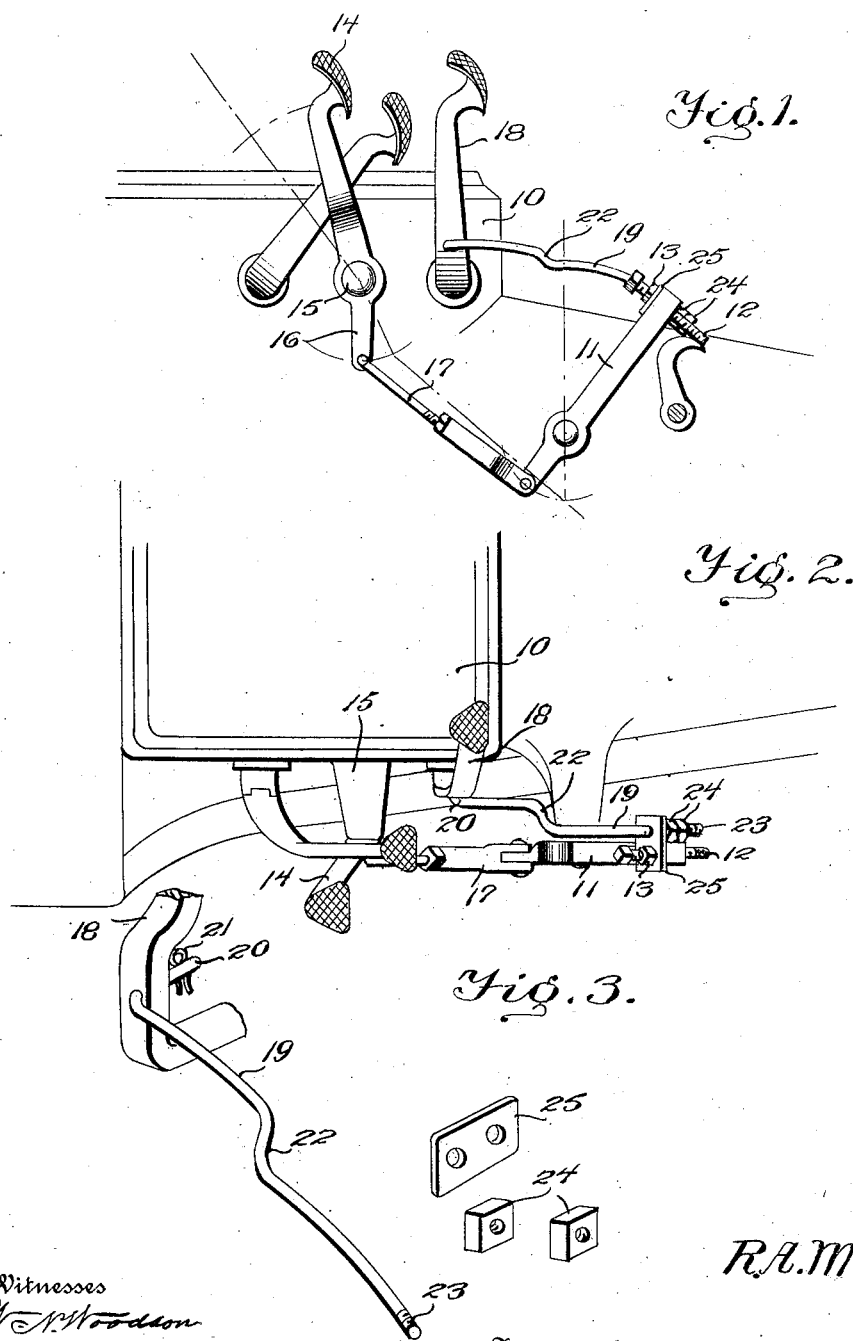

ROBERT A. McEWEN, OF NATOMA, KANSAS.

LEVER-CONTROL MECHANISM FOR MOTOR-VEHICLES.

1,058,883.  Specification of Letters Patent.  Patented Apr. 15, 1913.

Application filed May 19, 1911. Serial No. 628,323.

*To all whom it may concern:*

Be it known that I, ROBERT A. McEWEN, citizen of the United States, residing at Natoma, in the county of Osborne and State of Kansas, have invented certain new and useful Improvements in Lever-Control Mechanism for Motor-Vehicles, of which the following is a specification.

This invention relates to an improvement in lever control mechanism for motor vehicles, and has for one of its objects to provide a system of levers whereby the brake cannot be applied without releasing the clutch and freeing the motor to thereby prevent the working of the brake against the operation of the engine.

The invention further aims to provide a system of levers wherein the clutch may be freed independently of the brake mechanism, but wherein the brake cannot be applied without releasing the clutch.

The invention has for a still further object to provide a comparatively simple attachment for the control of levers now in common use and to so connect the same that the above enumerated results will be produced, the attachment being of such a nature that it can be readily and quickly applied to the levers.

For a full understanding of the invention reference is to be had to the following description and accompanying drawings, in which:

Figure 1 is a side elevation of the transmission and clutch casing with the improved lever system applied thereto; Fig. 2 is a top plan view of the same; and, Fig. 3 is a perspective view of the attachment, the parts of the same being partially separated from one another.

Corresponding and like parts are referred to in the following description and indicated in all the views of the drawing by the same reference characters.

Referring to the drawing, 10 designates the combined clutch and transmission casing having the clutch arm 11 mounted against one side of the same. The clutch arm 11 is of common form and is provided with a set screw 12 having a lock-nut 13 for securing it in adjusted position to limit the swinging movement of the arm 11. Against the same side of the casing 10, and forwardly of the arm 11, is a foot pedal or lever 14 pivoted at 15 and having a depending extension 16 to hingedly receive the forward end of the connecting rod 17 which is carried at its rear end in hinged relation upon the lower extremity of the clutch arm 11. The pedal 14 thus controls the movement of the clutch arm 11. A foot pedal or lever 18 is mounted at its lower end upon the same side of the casing 10 and has suitable connection with a braking mechanism disposed within the casing 10. As at present employed, the clutch operating mechanism and the brake mechanism are independent of one another, and it is the main object of this invention to provide an improved coupling between the brake and this clutch mechanism.

The attachment comprises an arcuate rod 19 provided at its forward end with an inturned finger 20 projecting through a transverse opening formed in the brake lever 18 adjacent to its lower end. A cotter pin 21 passes through the extremity of the finger 20 to hold the rod 19 upon the lever 18. The rod 19 extends back, is offset as at 22 to accommodate the same to the casing 10, and is provided with a threaded portion 23 over which are carried a pair of interlocking nuts 24. An attaching plate 25 is carried upon the upper end of the clutch arm 11, the plate 25 having openings in its opposite ends. The set screw 12 passes through the opening in one end of the plate 25 to bind the latter against the forward edge of the arm 11, the plate 25 extending inwardly from the arm. The other opening in the plate 25 receives loosely therethrough the rear end of the arcuate rod 19, the interlocking nuts 24 being disposed upon the rod 19 rearwardly of the attaching plate 25. The nuts 24 serve as a stop engaging the rear face of the plate 25 to swing the arm forward when the brake lever 18 is operated.

The operation of this lever control mechanism is apparent, since when it is desired to release the clutch independently of the brake mechanism, the lever 18 is moved forward but a short distance to bind the nuts 24 against the rear face of the plate 25 and draw the arm 11 forward sufficiently only to release the clutch. When the clutch is released, further forward movement of the lever 18 applies the brake while at the same time holding the clutch disengaged. As it is now used, the lever 14 not only controls the clutch arm 11 but it also operates the low or first speed gears of the transmission mechanism when the lever is swung to its foremost position. This adjustment of the lever 14 is disclosed by the dotted lines in Fig. 1, wherein the clutch arm 11 is swung forward without operating the brake lever 18. When the arm 11 moves forward the plate 25 is carried therewith away from the stop nuts 24, admitting of the loose movement of the plate 25 over the arcuate rod 19. It is thus observed that it is not necessary to operate two pedals in applying the brake to slacken the speed of the car, as the operation of applying the brake first releases the clutch to free the engine prior to the application of the brake. If it is desired to release the engine without applying the brake, as in coasting down grades and the like, it is only necessary to move the brake lever 18 forward a slight distance to release the clutch, and to move the lever 18 farther forward to check the speed of the vehicle.

Having thus described the invention, what is claimed is:

The combination with a clutch arm, means for operating the same, and a brake lever, of a plate secured rigidly to the clutch arm and projecting laterally therefrom and provided with a transverse perforation in its free end, a rod pivoted at its front end to the brake lever and extending loosely through the said perforation, said rod having an arcuate portion formed about the fulcrum of the clutch arm as a center, and a stop on the free end of the said rod adapted to impinge against the said plate when the brake lever is actuated.

In testimony whereof, I affix my signature in presence of two witnesses.

ROBERT A. McEWEN. [L. S.]

Witnesses:
GEO. R. BEESLEY,
M. W. TRUMBLE.